United States Patent
Riverso et al.

(10) Patent No.: US 11,962,152 B2
(45) Date of Patent: Apr. 16, 2024

(54) METHOD FOR SUPERVISORY CONTROL OF BUILDING POWER CONSUMPTION

(71) Applicant: CARRIER CORPORATION, Palm Beach Gardens, FL (US)

(72) Inventors: Stefano Riverso, Cork (IE); Marcello Torchio, Cork (IE); Craig R. Walker, S. Glastonbury, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 299 days.

(21) Appl. No.: 17/255,048

(22) PCT Filed: Jun. 1, 2020

(86) PCT No.: PCT/US2020/035577
§ 371 (c)(1),
(2) Date: Dec. 22, 2020

(87) PCT Pub. No.: WO2020/243711
PCT Pub. Date: Dec. 3, 2020

(65) Prior Publication Data
US 2021/0126455 A1   Apr. 29, 2021

Related U.S. Application Data

(60) Provisional application No. 62/855,081, filed on May 31, 2019.

(51) Int. Cl.
*H02J 3/12* (2006.01)
*G05B 13/04* (2006.01)
(Continued)

(52) U.S. Cl.
CPC .............. *H02J 3/12* (2013.01); *G05B 13/048* (2013.01); *H02J 3/003* (2020.01); *H02J 3/004* (2020.01);
(Continued)

(58) Field of Classification Search
CPC .... H02J 3/12; H02J 3/003; H02J 3/004; H02J 3/381; H02J 2203/20; H02J 2300/20;
(Continued)

(56) References Cited

U.S. PATENT DOCUMENTS 7,502,768 B2   3/2009   Ahmed et al.
8,571,955 B2   10/2013  Al Faruque et al.
(Continued)

OTHER PUBLICATIONS

Chatzivasileiadis et al., "Cyber-Physical Modeling of Distributed Resources for Distribution System Operations", Proceedings of the IEEE, IEEE, New York, US, vol. 104, No. 4, Apr. 1, 2016, p. 789-806.
(Continued)

*Primary Examiner* — M. N. Von Buhr
(74) *Attorney, Agent, or Firm* — Carlson, Gaskey & Olds, P.C.

(57) ABSTRACT

A method for controlling power consumption includes receiving a flexibility request from an electrical utility and discovering energy relevant devices in a building. The energy relevant devices include electrical loads and alternative energy sources. Power requirements are predicted from an electrical utility for the loads, the prediction takes into account available power from the alternative power sources. Power set points are determined for the energy relevant devices based on the prediction. The power set points meet the flexibility request. The energy relevant devices are directed to operate at the power set points. A building energy management system is also disclosed.

12 Claims, 3 Drawing Sheets

(51) Int. Cl.
*H02J 3/00* (2006.01)
*G06Q 50/06* (2012.01)
*H02J 3/38* (2006.01)

(52) U.S. Cl.
CPC .............. *G06Q 50/06* (2013.01); *H02J 3/381* (2013.01); *H02J 2203/20* (2020.01); *H02J 2300/20* (2020.01); *H02J 2310/12* (2020.01); *H02J 2310/52* (2020.01)

(58) Field of Classification Search
CPC .............. H02J 2310/12; H02J 2310/52; G05B 13/048; G05B 15/02; G05B 2219/2642; G06Q 50/06
See application file for complete search history.

(56) References Cited

U.S. PATENT DOCUMENTS

| | | | |
|---|---|---|---|
| 8,600,572 B2 | 12/2013 | Sri-Jayantha | |
| 8,653,968 B2 | 2/2014 | Brown et al. | |
| 8,818,563 B2 | 8/2014 | Gwerder et al. | |
| 8,872,379 B2 | 10/2014 | Ruiz et al. | |
| 8,880,226 B2 | 11/2014 | Raman et al. | |
| 8,880,231 B2 | 11/2014 | Boucher et al. | |
| 8,957,634 B2 | 2/2015 | Lo et al. | |
| 9,076,111 B2 | 7/2015 | Delorme et al. | |
| 9,348,952 B2 | 5/2016 | Wen et al. | |
| 9,367,108 B2 | 6/2016 | Asghari et al. | |
| 9,429,927 B2 | 8/2016 | Nesler et al. | |
| 9,444,257 B2 * | 9/2016 | Wells | H02J 3/16 |
| 9,471,082 B2 | 10/2016 | Sloop et al. | |
| 9,519,874 B2 | 12/2016 | Macek et al. | |
| 9,535,411 B2 | 1/2017 | Wei et al. | |
| 9,568,519 B2 | 2/2017 | Hwang et al. | |
| 9,575,475 B2 | 2/2017 | Drees et al. | |
| 9,595,070 B2 | 3/2017 | Matsuoka et al. | |
| 9,667,107 B2 | 5/2017 | Yamada et al. | |
| 9,671,768 B2 | 6/2017 | Lo et al. | |
| 9,731,615 B2 | 8/2017 | Uyeki et al. | |
| 9,740,183 B2 | 8/2017 | Chen | |
| 10,651,654 B2 * | 5/2020 | Yi | H02J 3/38 |
| 11,381,081 B2 * | 7/2022 | Hannon | H02J 3/388 |
| 2004/0102937 A1 | 5/2004 | Ibrahim | |
| 2010/0017045 A1 | 1/2010 | Nesler et al. | |
| 2010/0138363 A1 | 6/2010 | Batterberry et al. | |
| 2012/0316914 A1 | 12/2012 | Lee et al. | |
| 2013/0144451 A1 * | 6/2013 | Kumar | G05B 13/02 700/291 |
| 2013/0238139 A1 * | 9/2013 | Boucher | G06Q 50/06 700/275 |
| 2014/0172400 A1 | 6/2014 | Majewski et al. | |
| 2014/0180663 A1 * | 6/2014 | Acharya | H02J 13/00034 703/18 |
| 2014/0312128 A1 | 10/2014 | Matsuoka et al. | |
| 2014/0330695 A1 * | 11/2014 | Steven | H02J 3/00 705/37 |
| 2014/0358508 A1 | 12/2014 | Raghunathan et al. | |
| 2015/0178421 A1 | 6/2015 | Borrelli et al. | |
| 2015/0248118 A1 | 9/2015 | Li et al. | |
| 2015/0316282 A1 | 11/2015 | Stone et al. | |
| 2016/0195888 A1 | 7/2016 | Wenzel et al. | |
| 2016/0276832 A1 | 9/2016 | Kawai et al. | |
| 2016/0291561 A1 | 10/2016 | Al-Mohssen et al. | |
| 2016/0320081 A1 | 11/2016 | Nikovski | |
| 2016/0334825 A1 | 11/2016 | Nesler et al. | |
| 2016/0370778 A1 | 12/2016 | Kopp et al. | |
| 2017/0083037 A1 | 3/2017 | Soo | |
| 2017/0089601 A1 | 3/2017 | Patil et al. | |
| 2017/0102162 A1 | 4/2017 | Drees et al. | |
| 2017/0163084 A1 | 6/2017 | Malone | |
| 2017/0177766 A1 | 6/2017 | Song et al. | |
| 2017/0207633 A1 | 7/2017 | Nakayama et al. | |
| 2017/0256004 A1 | 9/2017 | Hooshmand et al. | |
| 2018/0090936 A1 * | 3/2018 | Guo | H02J 3/381 |
| 2018/0196456 A1 | 7/2018 | Elbsat | |
| 2018/0209674 A1 | 7/2018 | Ridder et al. | |
| 2018/0219374 A1 | 8/2018 | Pavlak et al. | |

OTHER PUBLICATIONS

"Generic Smart Grid Requirements—Part 2-3: Domains—Resources connected to the grid related domains, these include Bulk Generation, Distributed Energy Resources, Smart Home/Commercial/Industrial/DR-Customer Energy Management, and Energy Storage", SYCSMABTENERGY/8g/DT, IEC, Jun. 8, 2018, p. 1-374.
The International Search Report and Written Opinion for International Application No. PCT/US2020/035577 dated Aug. 31, 2020.
International Preliminary Report on Patentability for International patent Application No. PCT/US/2020/035577 dated Dec. 9, 2021.

\* cited by examiner

METHOD FOR SUPERVISORY CONTROL OF BUILDING POWER CONSUMPTION

CROSS-REFERENCE TO RELATED APPLICATION

This application claims priority to U.S. Provisional Application No. 62/855,081 filed May 31, 2019.

BACKGROUND

Buildings, such as university buildings, office buildings, residential buildings, commercial buildings, and the like, incorporate one or more electrically powered systems and devices. The electrically powered systems and devices, or loads, can be powered at least partially by electricity supplied from a centralized electrical power source or utility ("electrical grid"). The electrically powered systems and devices communicate with the electrical grid regarding power demand and availability.

SUMMARY

A method for controlling power consumption according to an example of this disclosure includes receiving a flexibility request from an electrical utility and discovering energy relevant devices in a building. The energy relevant devices include electrical loads and alternative energy sources. Power requirements are predicted from an electrical utility for the loads. The prediction takes into account available power from the alternative power sources. Power set points are determined for the energy relevant devices based on the prediction. The power set points meet the flexibility request. The energy relevant devices are directed to operate at the power set points.

In a further example of the foregoing embodiments, data is extracted from the energy relevant devices, and the predictions are based on the data.

In a further example of any of the foregoing embodiments, models are extracted for energy consumption or generation from the energy relevant devices. The predicting is based on the models.

In a further example of any of the foregoing embodiments, models are generated for energy consumption or generation for the energy relevant devices. The predicting is based on the models.

In a further example of any of the foregoing embodiments, the power set points are optimized for the energy relevant devices.

In a further example of any of the foregoing embodiments, the optimizing includes computing a baseline trajectory for one or more key performance indicators for a load selected from the energy relevant devices.

In a further example of any of the foregoing embodiments, optimizing includes deriving a reduced order model for the one or more key performance indicators based on the baseline trajectory.

In a further example of any of the foregoing embodiments, faults are detected in the reduced order model.

In a further example of any of the foregoing embodiments, the faults are resolved according to a raking of the severity of the faults.

In a further example of any of the foregoing embodiments, the loads include at least one of an HVAC (heating, ventilation, and air conditioning) system, a lighting system, and a security system.

In a further example of any of the foregoing embodiments, the alternative energy sources include at least one of a renewable energy source, a generator, and a power storage device.

A method for controlling power consumption according to an example of this disclosure includes receiving a flexibility request from an electrical utility, computing a baseline trajectory for one or more key performance indicators for an electrical load, deriving a reduced order model for the one or more key performance indicators based on the baseline trajectory, determining a power set points for the electrical load based on the reduced order model, the power set points meeting the flexibility request, and directing the load to operate at the power set point.

In a further example of the foregoing embodiments, faults are detected in the reduced order model.

In a further example of any of the foregoing embodiments, the faults are resolved according to a ranking of the severity of the faults.

In a further example of any of the foregoing embodiments, the load is one of an HVAC (heating, ventilation, and air conditioning) system, a lighting system, and a security system.

A building energy management system according to an example of this disclosure includes a computing device that is configured to receive a flexibility request from an electrical utility, discover energy relevant devices in a building, the energy relevant devices including electrical loads and alternative energy sources, predict a power requirement from an electrical utility for the loads, the prediction taking into account available power from the alternative power sources, determine power set points for the energy relevant devices based on the prediction, the power set points meeting the flexibility request, and direct the energy relevant devices to operate at the power set points.

In a further example of the foregoing embodiments, the loads include at least one of an HVAC (heating, ventilation, and air conditioning) system, a lighting system, and a security system.

In a further example of any of the foregoing embodiments, the alternative energy source includes at least one of a renewable energy source, a generator, and a power storage device.

In a further example of any of the foregoing embodiments, the computing device is configured to extract data from the energy relevant devices and predict the power requirement based on the data.

In a further example of any of the foregoing embodiments, the computing device is configured to optimize the power set points for the energy relevant devices.

These and other features may be best understood from the following specification and drawings, the following of which is a brief description.

DETAILED DESCRIPTION

Demand-side management (DSM) for electric systems and devices includes various methods and directives for reducing or increasing the power demand on centralized electrical power sources by modulating the consumption of electrical systems and devices. These methods and directives can include incorporating energy sources other than electrical power, (e.g., solar power or other forms of renewable energy), incorporating electrical power storage systems, and controlling flexible power demands. Generally, the electrical power source is in communication with the systems or devices (e.g., one or more loads) to which it provides electrical power. The electrical power source and load(s) share information and make decisions about how and when to produce and consume electrical power. In this way, DSM allows an electrical power source, such as a "smart" electrical grid, to balance power production and consumption.

Where the power demand of the load is flexible, DSM can be employed to improve the efficiency of power generation and consumption. The electrical power source communicates information about power generation and consumption to the electrical load. In this way, the load can respond to the information from the electrical power source. For instance, at peak electrical demand times, the electrical load can reduce power consumption. As another example, if there is a peak in generation of power from alternative power sources, the electrical load can increase power consumption to avoid instabilities and blackouts due to unexpected power availability.

Figure 1:
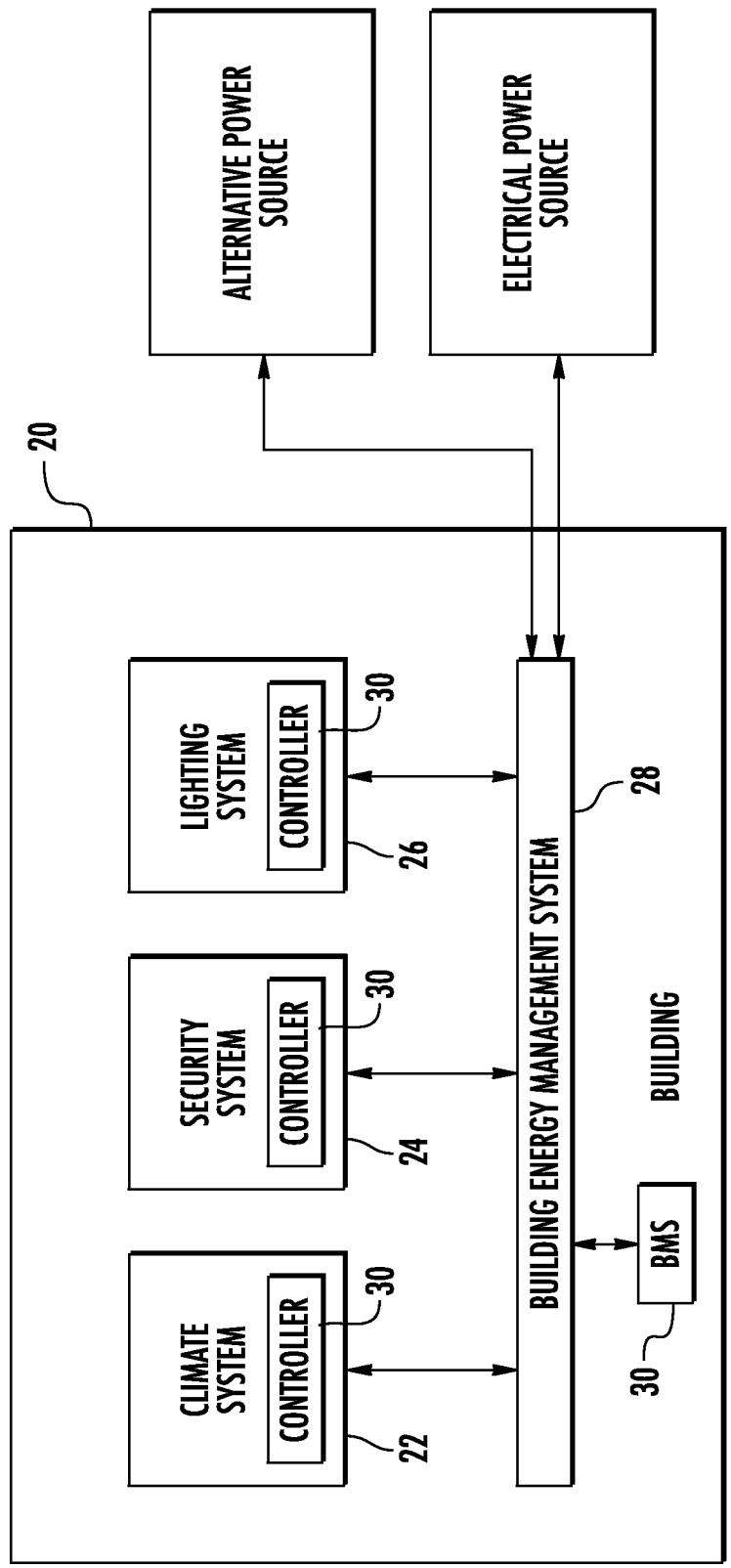
FIG. 1 schematically illustrates a building having one or more electrical systems.

FIG. 1 schematically illustrates a building 20. Building 20 incorporates at least one load, such as climate control or heating, ventilation, and air conditioning (HVAC) system 22, lighting system 24, and security system 26, though other electrical systems are known in the art. The systems 22, 24, 26 are in communication with a building energy management system (BEMS) 28. Though the BEMS 28 is shown in the building 20 in FIG. 1, it should be understood that the BEMS 28 may in whole or in part be deployed at a location remote from the building 20, e.g., via cloud technology.

The loads in building 20 are heterogeneous. That is, the loads each have respective power consumption requirements and power flexibilities. Some of these loads may have flexible power demands which change over time. For instance, the power demand may vary with building 20 occupancy, exterior climate, occupant comfort requirements, and the like. For instance, the electrical power consumption may be variable (flexible) based on number of building occupants, location of the occupants within the building, occupant preferences, or other variables. In one example, the building 20 is an office building. The office building 20 may be occupied during normal business hours and not occupied at night time. Therefore, requirements for lighting and heating/cooling the building 20, for instance, are reduced at night time, whereas requirements for building security may be increased at night time. As another example, the office building 20 may include a conference room which is occupied during specific meeting times and otherwise unoccupied. Therefore, requirements for lighting and heating/cooling the conference room may be increased during the meeting times whereas requirements for lighting and heating/cooling other areas of the building may be decreased during the meeting times. Accordingly, the requirements for the loads can vary with time and vary between specific areas or rooms of the building 20. Still, the power flexibilities of each system 22, 24, 26 are defined so that the systems provide the required services. For instance, the HVAC system 22 may have a minimum power consumption that maintains certain building 20 occupant comfort requirements.

The BEMS 28 is or includes a computing device, such as a processor, that is configured to receive and analyze information regarding power consumption/generation of energy-relevant devices, as will be discussed in more detail below. The BEMS 28 is also configured to receive information from an electrical power source, such as a "smart grid," in the form of requests to change the power consumption for the building 20. The BEMS 28 is also configured to communicate with alternative power sources regarding power consumption of the building 20 and power availability from the alternative power sources. Alternative power sources are power sources other than an electrical utility (e.g., the grid) and can, for instance, include renewable energy sources (e.g., solar panels), generators, power storage devices, or other power sources. The BEMS 28 is also configured to direct the operation of energy-relevant devices.

In one example, the building 20 components (e.g., BEMS 28 and systems 22, 24, 26) are part of an "internet of things."

In general, the BEMS 28 operates to reduce or increase power consumption of the building 20 while still maintaining the comfort of building 20 occupants according to the methods described herein. In some examples, the BEMS 28 operates to reduce power consumption of the building 20 specifically from the electrical power source by supplementing power from the alternative power sources discussed above.

Figure 2:
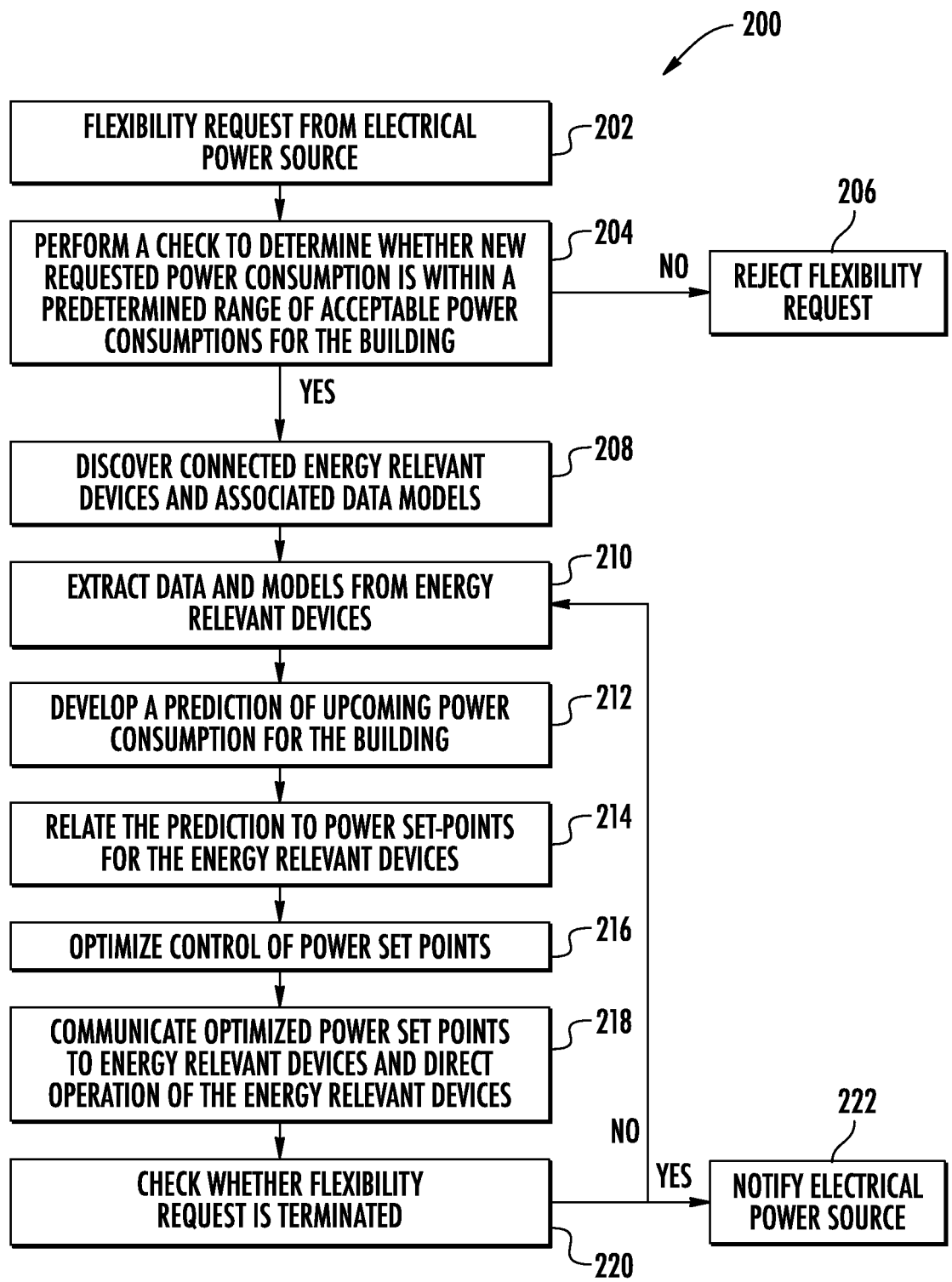
FIG. 2 schematically illustrates a method for demand-side management of power consumption of the building of FIG. 1.

FIG. 2 schematically shows a method 200 of DSM for the building 20. In one example, the method 200 starts at step 202 automatically, or without any user input. In another example, the electrical power source starts the method 200 at a predetermined time of day. In another example, the electrical power source starts the method 200 at predetermined time intervals.

In step 202, the BEMS 28 receives a flexibility request from an electrical utility (e.g., the grid). As discussed above, the various loads in the building 20 can have flexible power requirements. The power flexibility of the building 20 represents an acceptable increase or reduction (e.g., a change) in the power demand of the building 20 from a previous power demand. In some examples, the power flexibility is a range (e.g., it has an upper and lower bounds). An "acceptable" increase or reduction in the power demand of the building 20 means the systems 22, 24, 26 are still able to meet predetermined requirements, such as occupant comfort requirements, as discussed above. The power flexibility of the building 20 is a cumulative power flexibility of the loads (systems 22, 26, 28) of the building 20. The flexibility request thus represents a request from the electrical power source for the building 20 to change its power consumption to a new acceptable power consumption.

In step 204, the BEMS 28 performs a check to determine whether the flexibility request from step 202 is within the range of acceptable power consumption for the building 20. In some examples, the acceptable power consumption takes into account the availability of power from the alternative power sources discussed above. For example, if power is available from the alternative power sources, the building 20 can draw less power than is required from the electrical power source and supplement power from the alternative power sources to obtain the required power. If no, the BEMS 28 rejects the flexibility request in step 206.

If yes, in step 208, the BEMS 28 discovers connected energy-relevant devices and associated data models. Energy-relevant devices include loads (e.g, systems 22, 24, 26 which use power) and alternative power sources. In some examples, these loads and alternative power sources may each include a controller that is operable to collect data regarding power consumption/generation, and communicate the data and/or models to the BEMS 28, which is in turn operable to analyze and model the data. In another example, the controllers of the loads and alternative power sources are operable to analyze and model the data and communicate the models to the BEMS 28. The models may be generated based on any known mathematical modeling techniques, such as PWARX (PieceWise AutoRegressive eXogenous) models, artificial intelligence, machine learning, deep learning, etc. that take into account the collected data. The controllers are or include computing devices such as processors and/or electrical components programmed so that the controllers can perform as described herein.

In step 210, the BEMS 28 extracts data and models from the energy-relevant devices from step 208 via service requests (or APIs). In one example, the extraction includes extracting data from a "legacy" or existing building management system (BMS) 30 in the building 20. The legacy BMS 30 can report information about the systems 22, 24, 26 to the BEMS 28, for example. The data can include key performance indicators, or KPIs, from the devices. KPIs can include, for instance, power consumption, power generation, requests from the electrical power source, energy prices, occupant comfort, air quality, etc. In one example, the extraction includes extraction of "insights" for individual devices. Insights can include patterns or trends for the KPIs.

In step 212, the BEMS 28 uses auto-commissioning methods to develop a prediction of upcoming power consumption for the building 20 based on the data and models from step 210 according to any known modeling and predictive methods. In one example, the prediction is made over a predetermined time period, known as a "prediction horizon," e.g., the prediction is for power consumption in the next hour. In one example, the prediction takes into account available power from alternative power sources, as discussed above. That is, the prediction is effectively a power requirement specifically from the electrical power source.

In step 214, the BEMS 28 relates the prediction from step 212 to power set-points for the energy relevant devices from step 208. Power set-points represent the power generation/consumption for a power source or load for a time period. Thus, in step 214, the BEMS 28 determines power set points for the devices from step 208 that are commensurate with the prediction from step 212.

In step 216, the BEMS 28 optimizes the control of the power set points from step 216 according to any known control optimization protocol or method so that the power set points meet the flexibility request from step 202, e.g., the power consumption is at or below the new requested power consumption, and the power consumption of the building 20 remains acceptable. The optimizing takes into account both the flexibility request from step 202 and building 20 occupant comfort requirements. For instance, this predictive optimization can be based on well-known quadratic or linear programming.

In step 218, the BEMS 28 communicates optimized power set points from step 216 to the energy-relevant devices from step 208 and directs the energy-relevant devices to operate at the optimized power set points via APIs at controllers of the energy-relevant devices.

In step 220, the BEMS 28 performs a check to determine whether the flexibility request from step 202 is terminated. If yes, in step 222, the BEMS 28 notifies the grid that the flexibility request is terminated. If no, the method 200 returns to step 210 and proceeds to recursively update the optimized power set points according to steps 210-218.

Figure 3:
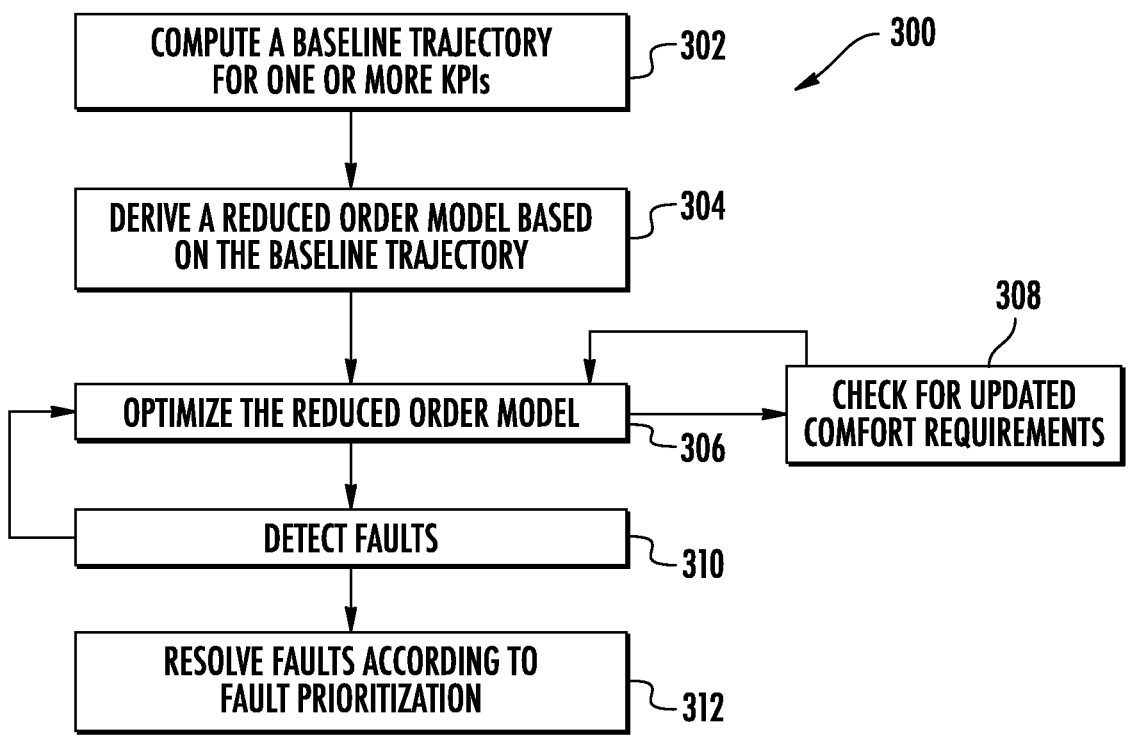
FIG. 3 schematically illustrates a method for controlling a climate system of the building of FIG. 1 according to the method of FIG. 2.

FIG. 3 schematically shows an example method 300 of predictive optimization as in step 216 from the method 200 for an HVAC system 22 in the building 20. However, the should be understood that the methods 200 and 300 are applicable to any type of system or load in the building 20, and are not limited to HVAC system 22.

In step 302, the BEMS 28 computes a baseline trajectory for one or more KPI values of the HVAC system 22 based on the data from step 210.

In step 304, the BEMS 28 derives a reduced order model (ROM), which is a linear time-varying model, based on the baseline trajectory from step 302.

In step 306, the BEMS 28 optimizes the ROM from step 306 according to any known ROM optimization protocol or method to optimize KPI trends over the prediction horizon time period. The optimization takes into account occupant comfort requirements. In one example, the method 300 performs a check for updates in occupant comfort requirements in step 308 and takes into account the updated occupant comfort requirements. The ROM can then be used to optimize the power set points of step 216 in the method 200.

In step 310, the BEMS 28 performs a fault detection for the modeling and optimization in steps 304 and 306 by any known fault detection and diagnostics (FDD) protocol or method.

In step 312, the BEMS 28 adapts to resolve the faults identified in step 310 according to a prioritization of the faults, for instance, based on a predetermined ranking of severity of faults.

In some examples, the output from the fault detection can also provide information that can be used to update comfort requirements. For instance, when certain faulty conditions are encountered, the output can be used to update comfort requirements in step 308. Furthermore, the output from the fault detection can also be used to improve the optimization in step 306.

The methods 200, 300 described above allow for automatic supervisory control of power consumption for a building 20 with heterogeneous loads and alternative power sources, as discussed above. The methods proceed without the need for user input or intervention. Because the control is data-driven, e.g., based on data collected from the loads and alternative power sources, the methods enable fast and accurate response to DSM from an electrical power source, and an overall reduction in power consumption from the electrical power source. Furthermore, the methods are applicable any type and number of loads and alternative power sources, and therefore are scalable and replicable for a wide variety of applications. Additionally, because well-known computations are utilized, the methods do not require excessive computational resources.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method for controlling power consumption, comprising:
    receiving a flexibility request from an electrical utility;
    discovering energy relevant devices in a building, the energy relevant devices including electrical loads and alternative energy sources;
    predicting a power requirement from an electrical utility for the loads, the prediction taking into account available power from the alternative power sources;
    determining power set points for the energy relevant devices based on the predicted power requirement, wherein each power set point represents power consumption for an energy relevant device of the energy relevant devices in the building for a time period;
    optimizing the power set points for the energy relevant devices such that the power set points represent power consumption at or below a new requested power consumption of the flexibility request, wherein the optimizing includes computing a baseline trajectory for one or more key performance indicators for a load selected from the energy relevant devices based on data extracted from the energy relevant devices;
    directing the energy relevant devices to operate at the power set points;
    determining whether the flexibility request is terminated; and
    recursively updating the optimized power set points if the flexibility request is not terminated.

2. The method of claim 1, further comprising extracting data from the energy relevant devices, and wherein the predicting is based on the data.

3. The method of claim 2, further comprising extracting models for energy consumption or generation from the energy relevant devices, and wherein the predicting is based on the models.

4. The method of claim 2, further comprising generating models for energy consumption or generation for the energy relevant devices, and wherein the predicting is based on the models.

5. The method of claim 1, wherein the optimizing includes deriving a reduced order model for the one or more key performance indicators based on the baseline trajectory.

6. The method of claim 1, wherein the loads include at least one of an HVAC (heating, ventilation, and air conditioning) system, a lighting system, and a security system.

7. The method of claim 1, wherein the alternative energy sources including at least one of a renewable energy source, a generator, and a power storage device.

8. A method for controlling power consumption, comprising:
    receiving a flexibility request from an electrical utility;
    computing a baseline trajectory for one or more key performance indicators for an electrical load based on data extracted from the electrical load;
    deriving a reduced order model for the one or more key performance indicators based on the baseline trajectory;
    determining a power set points for the electrical load based on the reduced order model, wherein the power set point represents power consumption for the electrical load for a time period;
    optimizing the power set point such that the power set point represents power consumption at or below a new requested power consumption of the flexibility request;
    directing the load to operate at the power set point;
    determining whether the flexibility request is terminated; and
    recursively updating the optimized power set point if the flexibility request is not terminated.

9. The method of claim 8, wherein the load is one of an HVAC (heating, ventilation, and air conditioning) system, a lighting system, and a security system.

10. A building energy management system, comprising:
    a computing device configured to receive a flexibility request from an electrical utility, discover energy relevant devices in a building, the energy relevant devices including electrical loads and alternative energy sources, predict a power requirement from an electrical utility for the loads, the prediction taking into account available power from the alternative power sources, determine power set points for the energy relevant devices based on the predicted power requirement, wherein each power set point represents power consumption for an energy relevant device of the energy relevant devices in the building for a time period, optimize the power set points for the energy relevant devices such that the power set points represent power consumption at or below a new requested power consumption of the flexibility request, wherein the optimizing includes computing a baseline trajectory for one or more key performance indicators for a load selected from the energy relevant devices based on data extracted from the energy relevant devices, direct the energy relevant devices to operate at the power set points, determine whether the flexibility request is terminated, and recursively update the optimized power set points if the flexibility request is not terminated.

11. The system of claim 10, wherein the loads include at least one of an HVAC (heating, ventilation, and air conditioning) system, a lighting system, and a security system.

12. The system of claim 10, wherein the alternative energy sources include at least one of a renewable energy source, a generator, and a power storage device.

* * * * *